United States Patent [19]

Argy

[11] 4,417,603
[45] Nov. 29, 1983

[54] FLEXIBLE HEAT-INSULATED PIPE-LINE FOR IN PARTICULAR CRYOGENIC FLUIDS

[75] Inventor: Gilles Argy, La Queue Les Yvelines, France

[73] Assignee: Technigaz, France

[21] Appl. No.: 230,892

[22] Filed: Feb. 2, 1981

[30] Foreign Application Priority Data

Feb. 6, 1980 [FR] France .................. 80.02614

[51] Int. Cl.³ ............................................. F16L 11/00
[52] U.S. Cl. .................................. 138/149; 138/122; 138/131; 138/139; 138/148
[58] Field of Search ............... 138/122, 130, 131, 132, 138/133, 138, 139, 148, 149

[56] References Cited

U.S. PATENT DOCUMENTS

| | | | |
|---|---|---|---|
| 1,179,578 | 4/1916 | Sundh | 138/122 |
| 1,259,952 | 3/1918 | Beckmann | 138/122 |
| 2,858,854 | 11/1958 | Daggett | 138/137 |
| 3,388,724 | 6/1968 | Mowell et al. | 138/149 |
| 3,453,716 | 7/1969 | Cook | 138/149 |
| 3,527,258 | 9/1970 | Farr | 138/131 |
| 4,287,245 | 9/1981 | Kikuchi | 138/149 |

FOREIGN PATENT DOCUMENTS

| | | | |
|---|---|---|---|
| 1097220 | 1/1961 | Fed. Rep. of Germany . | |
| 255847 | 7/1977 | Fed. Rep. of Germany . | |
| 2705361 | 8/1978 | Fed. Rep. of Germany . | |
| 832518 | 9/1938 | France . | |
| 856496 | 6/1940 | France . | |
| 1602270 | 12/1970 | France . | |
| 2037631 | 12/1970 | France . | |
| 2167136 | 7/1973 | France . | |
| 2235324 | 1/1975 | France . | |
| 591307 | 8/1947 | United Kingdom | 138/122 |
| 1312509 | 4/1973 | United Kingdom . | |
| 1383313 | 2/1975 | United Kingdom | 138/122 |

Primary Examiner—John W. Shepperd
Attorney, Agent, or Firm—Steinberg & Raskin

[57] ABSTRACT

A fluid-conveying, flexible, lagged pipe for building up in particular a liquefied natural gas carrying pipe-line connecting an off-shore platform for working submarine oil fields or like underwater pools to a tanker ship and comprising an inner tubular duct including an inner helical metal spring, an intermediate layer of yielding composite material and an outer helical metal spring like the inner spring but longitudinally offset by half a pitch of turns with respect to the latter so that the turns of said outer spring be nested between those, respectively, of said inner spring.

34 Claims, 7 Drawing Figures

U.S. Patent Nov. 29, 1983 Sheet 1 of 2 4,417,603
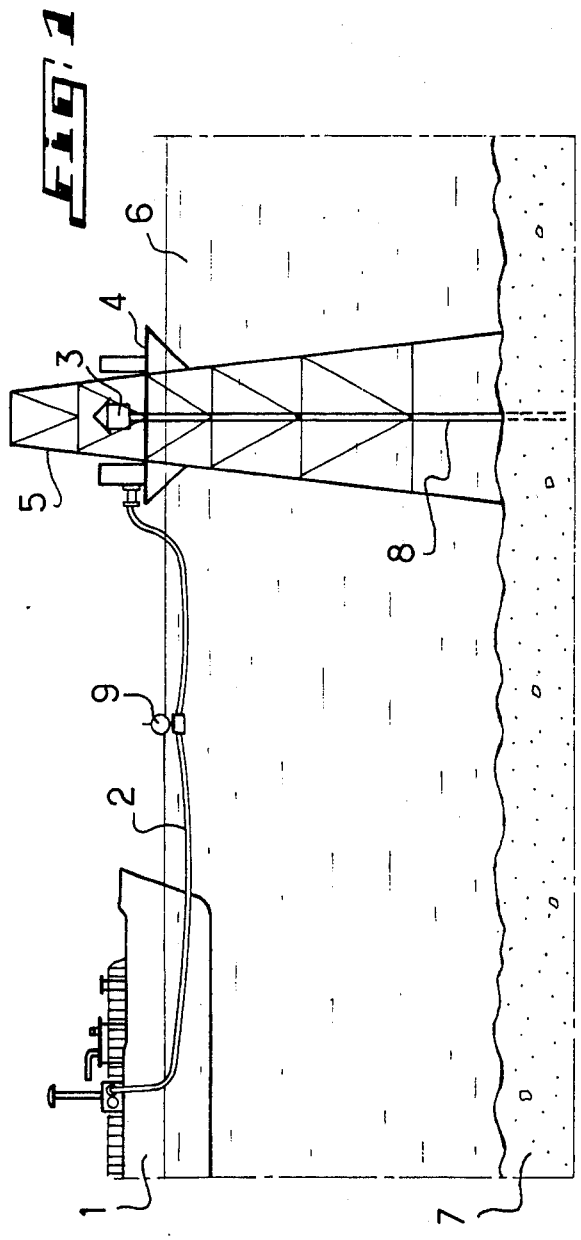
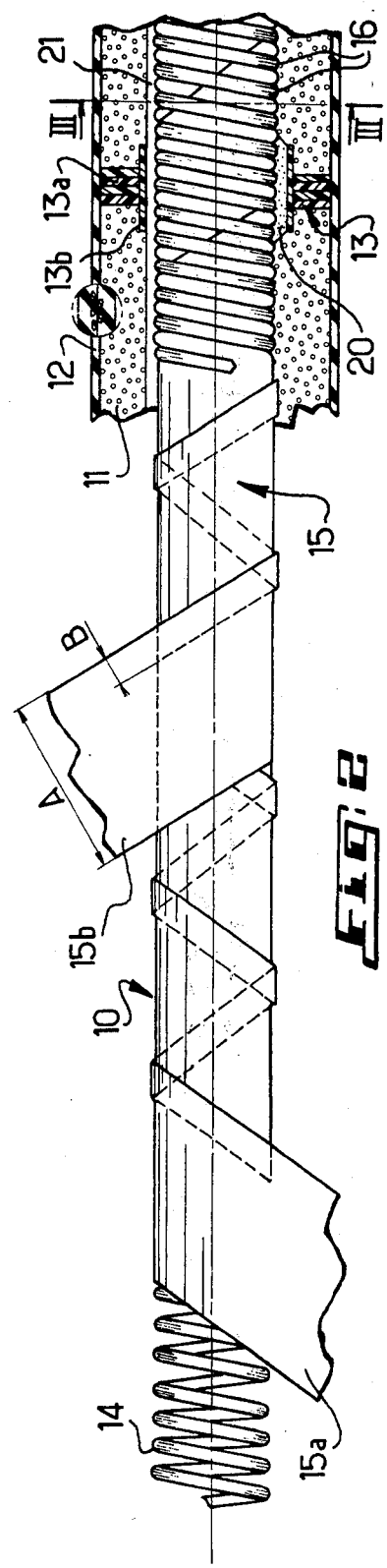

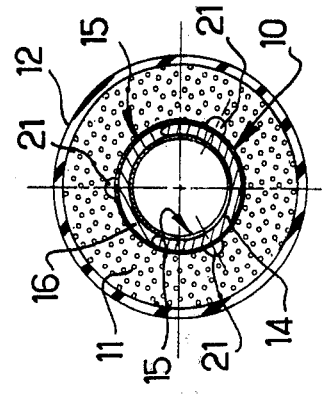
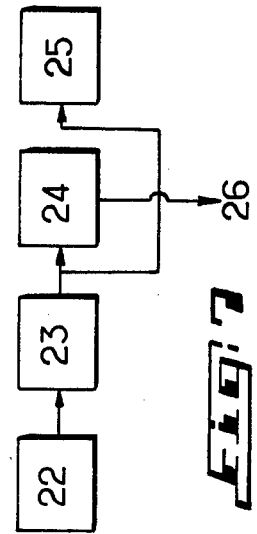
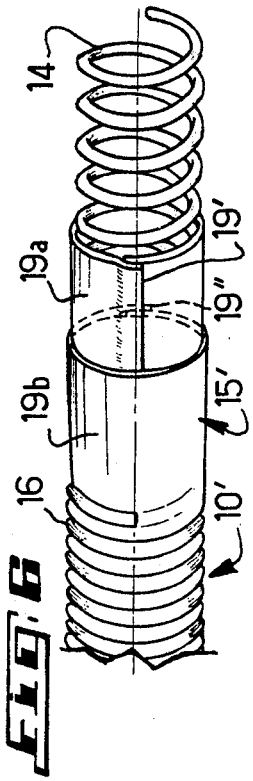
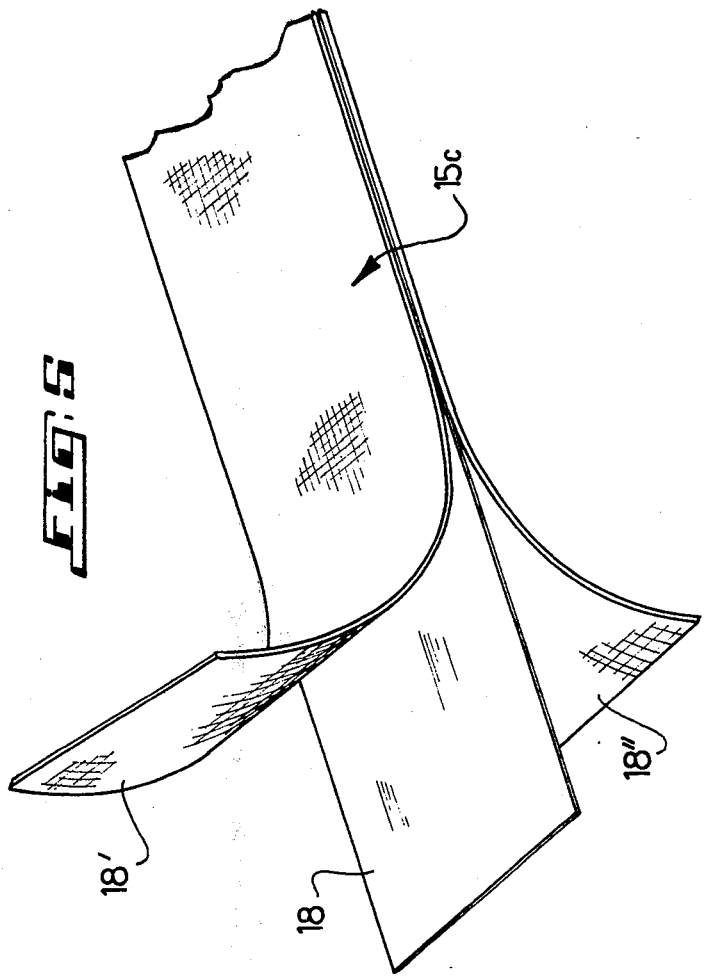
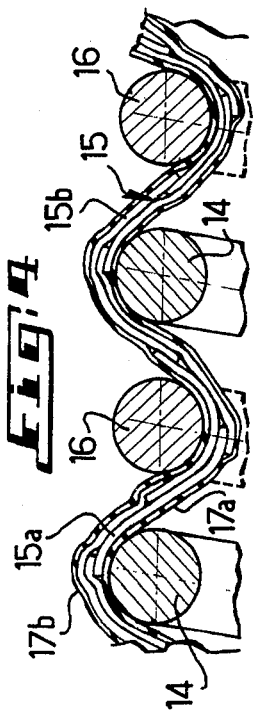

FLEXIBLE HEAT-INSULATED PIPE-LINE FOR IN PARTICULAR CRYOGENIC FLUIDS

The present invention relates generally to and has essentially for its subject matter a flexible heat-insulated pipe for carrying fluids in particular but not exclusively at a temperature substantially different from the ambient temperature and more specifically so-called cryogenic fluids such as for instance liquefied hydrocarbon and natural gases or the like. The invention is also directed by way of new industrial product to a building material forming one of the component elements of the structure of such a pipe and to an improved method of detecting leakages thereon as well as to the various applications and uses resulting from putting it into practice; the invention is at last directed to the various systems, assemblies, arrangements, appliances or devices, equipments, apparatus and installations provided with such pipes.

For loading and unloading, at sea, tanker ships conveying or carrying very cold fluids and in particular liquefied natural gas, it has already been proposed to make use of loading arms or like booms or jibs mounted on an off-shore column or platform for working submarine oil and/or natural gas fields and comprising rigid pipes connected to each other by rotary joint couplings or swivelling connectors and like fittings. Such a system, while having not yet been carried out hereintofore, suffers in particular from the following serious inconveniences:

In view of the separating distance of about 100 m between the tanker ship and the off-shore column or platform, the loading booms or arms have to be very long and accordingly very heavy and therefore would exhibit a great overhang or cantilever or outboard length resulting in excessive tilting moments (for instanc of about 5,000 tm).

Moreover as in particular in the North sea there currently are swells with wave troughs of about 7 m, it is necessary to lock the loading arm or boom in follow-up relationship with the instant relative position of the ship with respect to the platform or column; this would involve a position-bound follow-up correlation in space in accordance with the respective variations of the horizontal distance, the height or level and angular orientation of the ship under the combined effects of the swell, of the wind and of the marine currents. The cost of such a plant is very high because its cost price may reach and exceed for instance about one hundred million dollars. Such a high price would practically make the working of small submarine oil fields uneconomical and even impossible because the official regulations or prescriptions are now forbidding the oil companies to burn the gases associated with the working of such oil fields by on the contrary compelling these companies to use such gases.

As the design approaches based on the use of loading arms or booms are not economically feasible, one is logically led to contemplate the use of flexible fluid-transfer ducts or pipe-lines. Flexible pipings have previously been proposed for onshore or land applications or for establishing connections between ships and quays or wharfs.

The structure of such a known piping comprises: an inner yielding duct or tube, a heat insulation or lagging of poor mechanical behaviour or strength surrounding the inner duct and an outer protective wrapper or sheath surrounding this heat insulation. Such a known construction suffers in particular from the following inconveniences:

Such a piping is incapable of sustaining the very hard and tough or difficult operating service and working conditions prevailing at sea.

If the inner yielding duct consists of a corrugated or rippled or creased tube made from a tough (non brittle) metal such as for instance austenic stainless steel, the behaviour or resistance to cyclic fatigue of such a tube is bad in view of the stress concentrations produced by the steps of shaping or working of the corrugations or pleats or folds within the tube wall.

If a synthetic material is used for making the inner yielding duct, that material should be relatively thin (of a thickness lower than 0.5 mm) and used in the shape of a tape (of a width equal for instance to about twice to three times the winding diameter) helically wound or coiled with closely adjacent or contiguous turns in several (15 to 25) overlying layers, mutually offset by a fraction of winding pitch in order to provide fluid-tightness at the joints between contiguous turns of a same layer through partial overlap by the turns of the adjacent layer. Thereby is carried out a non-brittle i.e. tough and resiliently deformable structure but which has a bad behaviour or resistance to cyclic fatigue owing to the possibility of relative unidirectional slipping of the turns which produces their permanent irreversible shift resulting in a loss of fluid-tightness and on account of stress concentrations due to the partial loosening, detachment or separation of the turns with attendant danger of failure. This phenomenon is worsened by the presence of the fluid conveyed under pressure (of about 1 MPa).

A main object of the invention is to remove the aforesaid drawbacks by providing a flexible, heat-insulated fluid-carrying pipe, of the kind comprising: an inner tubular duct, an intermediate heat-insulating layer closely surrounding said inner duct and an outer protective casing, sheath or wrapper closely surrounding said intermediate layer. To solve the technical problem set, the inner tubular duct of the pipe should in particular comply with or meet the following requirements: it should be pressure-fluid tight; it should exhibit a sufficient resistance to fatigue as well as a satisfactory toughness; it should be preferably resiliently deformable; it is at last desirable that it exhibits an adequate mechanical resistance to inner pressure (this last requirement is optional but advantageous).

The desired result is obtained by means of a pipe according to the invention which for this purpose is characterized in that said inner tubular duct consists of at least three radially overlying closely adjacent layers comprising: a single inner layer consisting of a helically wound metal wire with mutually spaced turns; an intermediate layer of a yielding composite material surrounding said inner layer and a single outer layer substantially identical in particular at least in its diameters and winding pitch with said inner wire layer and wound onto said intermediate layer but with turns longitudinally off-set by half a pitch, respectively, in relation to those of said inner wire layer, so as to be located or accommodated between the turns, respectively, of the latter.

According to another characterizing feature of the invention said metal wire is made from a metal which is not brittle at low temperatures and under mechanical loads i.e. which does not exhibit ductile-fragile transition phenomenon, for instance of austenitic stainless steel and its winding pitch is preferably equal to about one half or to one third of its winding diameter.

According to still another characterizing feature of the invention, said intermediate heat-insulating layer consists of a flexible cellular or expanded material with a relative elongation on break which may reach 15% at very low temperature and said outer protective sheath or wrapper consists of a tough, flexible, fluid-tight tubular duct connected to said inner tubular duct through relatively stiff retaining distance-pieces, spacers or like braces preferably of cellular material which are longitudinally spaced and distributed at discrete positions while bearing against said inner tubular duct. These distance-pieces have the purpose of keeping the inner tubular duct centered with respect to the outer protective sheath or wrapper and subsidiarily to locally retransmit to the latter the radial forces sustained by the inner tubular duct, so that it somewhat performs the function of a binding hoop or like collar.

According to still a further characterizing feature of the invention a blanket or pad or like cushion of relatively soft or yielding foam material is inserted between each aforesaid distance-piece and said inner tubular duct and is preferably kept in a slightly compressed condition therebetween. Such an arrangement offers the advantage of allowing the inner tubular duct to expand or to swell or to be inflated under the pressure of the fluid flowing inside thereof.

The pipe according to the invention thus makes it possible to attain the goal previously set and is advantageous by the fact that it has a construction of relatively economic manufacture which does practically require no maintenance or servicing while exhibiting a high operating reliability or dependability as well a a great working safety.

The invention will be better understood and further objects, characterizing features, details and advantages thereof will appear more clearly as the following explanatory description proceeds with reference to the accompanying diagrammatic drawings given by way of non-limiting examples only illustrating several specific presently preferred embodiments of the invention and wherein:

FIG. 1 is an elevational view of an arrangement for loading a tanker ship with liquefied natural gas by means of a pipe-line comprising at least one pipe according to the invention and extending from an off-shore platform for exploiting the sea-bed or bottom;

FIG. 2 is a view in partial longitudinal section with parts broken away, drawn on a larger scale and showing the preferred embodiment of a pipe according to the invention;

FIG. 3 is a view in cross-section taken upon the line III—III of FIG. 2;

FIG. 4 is a separate fragmentary view in partial longitudinal section, drawn on a larger scale and showing the wall of the inner tubular duct of the pipe illustrated on FIG. 2;

FIG. 5 is a fragmentary perspective, partially exploded view of a strip, tape or sheet of yielding composite material adapted to form the intermediate layer of the inner tubular duct shown on FIG. 2;

FIG. 6 is a separate fragmentary view with parts broken away showing another embodiment of the inner tubular duct of the pipe according to the invention; and FIG. 7 shows a block diagram of the system for detecting leakages on the pipe according to the invention.

According to the examplary embodiment shown on FIG. 1, a tanker ship 1 for carrying liquefied natural gas has her tanks connected by at least one loading conduit or pipe-line 2 to the natural gas liquefaction factory or plant 3 arranged on the emerged heat or upper portion 4 of an off-shore platform 5 for exploiting a submarine oil-field 6 located at sea, which platform extends down to the sea-bed or bottom 7 into which extends at least one riser 8. The pipe-line 2 is for instance partly semi-submerged and held or supported in its submerged intermediate portion by at least one float 9.

The pipe-line 2 consists of one or several pipes according to the invention assembled or connected together endwise for instance by means of suitable flanges or the like. According to the preferred embodiment shown on FIGS. 2 to 5, the pipe according to the invention comprises successively from the inside towards the outside: an inner tubular duct generally denoted by the reference numeral 10, an intermediate heat-insulating layer 11 and an outer protective sheath or wrapper 12 inside of which the inner tubular duct 10 is kept relatively in position or centered by spaced distance-pieces 13 one of which only is shown on FIG. 2.

The inner tubular duct 10 successively comprises from the inside to the outside: one single substantially cylindrical round inner layer 14 consisting of a metal wire helically wound with mutually spaced turns; an intermediate layer made from yielding composite material generally denoted by the reference numeral 15 and one single substantially cylindrical round outer layer 16 preferably identical with the inner wire layer 14, i.e. having the same material, own diameter, winding diameter and winding pitch as the layer 14, this wound wire 16 being offset by half a winding pitch with respect to the wound wire 14 so that the turns of the wound or coiled wire 16 are respectively positioned between those of the wound or coiled wire 14 while being spaced therefrom by the intermediate layer 15 as in particular shown on FIG. 4. In the examplary embodiment shown the winding pitch of each wound or coiled wire 14, 16 is substantially uniform or constant in the longitudinal axial direction but this common winding pitch could possibly be variable in the longitudinal direction. Each wound or coiled wire 14, 16 is preferably of round cross-sectional contour and preferably made from austenitic stainless steel. Its own diameter is a function of its winding diameter which is itself determined by the nominal inner diameter of the inner tubular duct 10. The own diameter of the wire may thus be of 2 mm for a nominal inner tube diameter of 25 mm and this own diameter of the wire will for instance be of 10 mm for a nominal tube diameter of 250 mm to 300 mm. In general the nominal inner diameter of the inner tubular duct 10 will be in the range between about 254 mm and 406 mm. The uniform winding pitch will for instance correspond to about one half or one third of the winding diameter of the wire.

The intermediate layer 15 of the tubular duct 10 consists of at least one strip or tape helically wound or coiled preferably in one single layer onto the inner wire layer 14 with partial mutual connected and in particular stuck or adhesively bonded overlap of the successive turns of said tape or strip. The intermediate layer 15 consists advantageosly of at least two such substantially like strips or tapes, namely an inner strip 15a and an outer strip 15b, identically wound one onto the other but in reverse directions so as to cross each other and assembled or connected together in particular through adhesive bonding. Thus both strips 15a, 15b have respectively equal winding pitches but of opposite directions with same partial overlap of the successive turns of a same strip; moreover both strips preferably have the same width. This width is preferably equal to about twice to three times its winding diameter and the least width of overlap between adjacent turns of a same strip is advantageously equal to about one half of the width of the strip when the latter is less than 200 mm wide or to about 100 mm for a greater strip width. Thus each strip 15a, 15b will for instance have a width A of about 600 mm for a winding diameter of about 300 mm with a width B of partial mutual overlap between adjacent turns in particular of about 100 mm. Instead of using two separate or distinct strips 15a, 15b, it is conceivable to use one and a same strip for carrying out one single winding consisting of two overlying layers which are wound in opposite directions with respect to each other through mutual crossing of their respective turns but this may give rise to difficulties of connecting both layers together, i.e. at the start of the winding of the second or outer layer, which start or beginning should be provided by at least one fold of strip overturning which is rather difficult to carry out.

Both overlying layers respectively consisting of the inner wound strip 15a and of the outer wound strip 15b are assembled together in joined relationship preferably through sticking or gluing or by means of an equivalent adhesive bonding connection carried out by means of an adhesive having a particularly low setting or hardening point in particular in the range between −50° C. and −70° C. as well as a relative elongation on break in the set or hardened condition advantageously lying in the range between about 5% and about 10%. Owing to the low value of the hardening or setting temperature of the adhesive, the thermal stresses are lower in the set or hardened state thereof at lower temperatures, whereby the occurrence of cracks, cracklings and clefts likely to impair fluid-tightness may be avoided. A relatively high elongation on break of the adhesive in the set state or hardened condition makes it possible to achieve a good toughness or mechanical strength of the stuck or bonded assembly.

An adhesive or glue of at least the same nature is advantageously used for assembling the successive adjacent turns of a same strip through adhesive bonding in their respective areas B of partial mutual overlap.

The glue or adhesive used is advantageously based on synthetic chloroprene rubber or on polyurethane elastomer and is such as that known in the trade under the name of "ZEBRON" (sold by the French company A.T.R.), or "ADIPRENE" (sold by the U.S. company Du Pont de Nemours), or "RW-14-74-86" (sold by the American company Products Research and Chemical Corporation).

Both opposite respectively inner and outer end sides of the intermediate layer 15 of the inner tubular duct 10, which are respectively engaging the inner metal wire 14 and the outer metal wire 16 (or in the case of one intermediate layer 15 consisting of two strips 15a, 15b, the inner side of the inner strip 15a and the outer side of the outer strip 15b), are each advantageously faced, coated or covered with a flexible liner (see FIG. 4) of a nature promoting the slipping of the intemediate layer 15 against the inner metal wire 14 and the outer metal wire 16, respectively, (while reducing the coefficient of sliding friction between the metal of the wires and said layer) and serving the purpose of increasing the resistance to abrasion (that is to wear through rubbing) of the corresponding sides of said intermediate layer 15 while at the same time providing for the cohesion of the texture of said sides. This liner consists for instance of a polyurethane elastomer or of a plastics material with equivalent properties or qualities. This yielding liner is for instance about 0.3 mm thick on each side of the intermediate layer 15.

The flexible composite material forming the single strip or each strip 15a, 15b of the single or multiple strip 15 of the inner tubular duct 10, consists of at least one sheet, foil or web of laminated structure having for instance an aggregate thickness of about 1 mm, such as shown on FIG. 5. This laminated structure 15c consists of at least three overlying layers comprising an impervious middle layer 18 inserted between two preferably identical end layers 18', 18" which however have a nature differing from that of the central layer 18. These adjacent layers are assembled in close order to each other preferably through adhesive bonding or sticking for instance by means of a glue or adhesive substance based on synthetic chloroprene rubber or the like.

The impervious middle layer 18 is advantageously metallic and consists of a very thin metal sheet, strip-iron or like foil made in particular from so-called 18-8 austenitic stainless steel with a thickness in particular of about 0.1 mm to 0.2 mm. This allied steel corresponds in particular to the French standard designation Z3CN18-8 or to the standard American designation AISI 304 L.

Each end layer 18', 18" consists of a fabric made from synthetic textile fibers or from a like cloth or web advantageously exhibiting a weave for plain or unornamented cloths or like tabby or calico or taffet weave. These synthetic textile fibers are preferably aromatic polyamide (so-called "aramide") fibers such as the synthetic material commercially known under the trade name of "KEVLAR" (from the American firm Du Pont de Nemours). This fabric has a specific surface gravity or mass lying preferably in the range between 300 g/m² and 500 g/m² with a thickness for instance of about 0.4 mm.

Such a composite structure exhibits an outstanding toughness or mechanical strength especially at low temperature since its breaking tensile strength is above about 589 kN/m at an ambient temperature of about 20° C. and approximately equal to 981 kN/m at the very low temperature of about −190° C. It should be pointed out that said flexible lining or cladding 17a, 17b, applied onto the outer side of at least one end layer 18', 18" or on both layers would increase the resistance to abrasion or wear of the fabric while providing for the cohesion of the threads or yarns or fibers of the fabric.

The invention is also directed by way of new industrial product to the flexible sheet-like, foil-like, plate-like, web-like or panel-like material consisting of the composite or laminated substance such as defined previously and shown on FIG. 5 of the drawings.

It should be pointed out that on FIG. 2 and for the sake of a better understanding of the drawings the outer layer of wound or coiled metal wire 16, the heat-insulating intermediate layer 11 and the outer protective sheath or casing 12 have been discontinued so as to not extend throughout the length of the inner tubular duct 10 while being thus shown on the right-hand end portion of the Figure, only, so as to uncover the intermediate layer 15 and the inner layer of wound or coiled metal wire 14 of the inner tubular duct 10. Likewise the intermediate layer 15 of wound strips or tapes does not extend to the left-hand end of the Figure so as to let the inner layer 14 of wound metal wire project beyond the latter.

According to an alternative embodiment said intermediate layer 15 may consist of at least one close jointed cover, jacket or sleeve consisting of a strip or tape of adequate width having the same nature or structure as the composite strip 15c shown on FIG. 5 and close-jointed sidewise on itself with partial mutual overlap of its close-jointed or meeting longitudinal edges assembled together in particular by being stuck, glued or adhesively bonded. FIG. 6 shows such an intermediate layer 15' consisting of at least two such overlying close-jointed covers, jackets or sleeves, namely an inner jacket 19a and an outer jacket 19b slipped in closely engaging relationship one over the other and assembled together by sticking, gluing or adhesive bonding for instance. The respective overlapping longitudinal joints, seams or stitches 19', 19" of both jackets are preferably angular offset or shifted with respect to each other by being possibly arranged in diametrally opposite relationship as shown on FIG. 6. Also according to this Figure as on FIG. 2 the various component intermediate and outer layers 15', 16, respectively, do not extend over the full length of the duct shown but have been discontinued so that all of the component layers respectively project beyond each other so as to thereby be uncovered over one portion to facilitate the understanding of the whole construction.

The inner and outer layers of wound metal wire 14 and 16, respectively, are made from resiliently deformable metal so that they each one form a cylindrical helical spring. The common winding pitch, i.e. the preferably uniform spacing between the successive windings or turns of each spring is such that the spacing between the turns or windings of a same spring is greater than the diameter of the wire of this spring so that each turn or winding of the outer spring 16 which is located between two successive turns or windings of the inner spring 14 be bilaterally spaced from the latters. Thus the inner tubular duct consists essentially of a composite spring consisting of two component springs 14, 16 mutually nested or imbricated into each other so that the turns or windings of one of these two springs be arranged in alternating relationship with those of the other springs, both springs being physically separated by the intermediate layer 15 which geometrically assumes the shape of a circular surface of revolution about the central longitudinal axis or centre line of the duct 10, having generating lines of wavy or undulated configuration as shown in particular on FIG. 4. The inner tubular duct is thus resiliently deformable or flexible.

Referring more particularly to FIGS. 2 and 3, said heat-insulating intermediate layer 11 which has a radial thickness for instance lying in the range between about 50 mm and 125 mm according to the pipe diameter consists of at least one layer made of yielding cellular material such as in particular:

a polypropylene-oxide foam;

a poly(vinyl chloride) foam with incorporated plasticizers (such as the mastic-like compound BM 33 of the firm Kléber-Rénolite), an ethylene-vinyl acetate copolymer foam (such as the product "S-Foam" of the Japanese firm I.H.I.).

This lagging offers the advantage of a high relative elongation on break which may reach 15% at very low temperature and it is preferably made in prefabricated shells for instance of about 5 cm to 12.5 cm thickness according to the pipe diameter, such shells being then assembled together about the inner tubular duct 10.

Said fluid-tight protective outer sheath or casing 12 consists advantageously of a tube made from rubber or synthetic resin strengthened with reinforcing for instance metal wires, cords or threads. Such reinforcing metal wires are preferably made from ferritic steel and distributed in several overlying sheets of parallel wires inclined within each sheet with respect to the longitudinal centre line axis of the pipe with the wires of two successive sheets crossing each other, said wires being bonded by a synthetic resin based for instance on aliphatic polyamide such as that commercially known under the trade name "RILSAN". That substance is particularly suitable on account of its qualities of fluid-tightness preventing moisture from entering the inside of the pipe 12 and on account of its behaviour or resistance to mechanical forces (in particular to tensile stresses, to shocks or impacts and to the inner pressure).

Each aforesaid distance-piece or spacer 13 is advantageously made from a relatively rigid polyurethane foam of an apparatus specific gravity of about 0.5, i.e. having an apparent specific mass or density of about 500 kg/m$^3$ and exhibiting high mechanical characteristics. Each distance-piece assumes for instance the shape of a substantially flat circular disc 13a the outer diameter of which corresponds substantially to the inner diameter of the pipe 12 and through which extends a central opening defined by a cylindrical sleeve 13b rigidly connected with its outer wall to the edge of this central opening. The inner diameter of this sleeve 13b may correspond substantially to the outer diameter of the inner tubular duct 10 or 10' so that the distance-piece 13 bear directly upon the outer wall of this duct or it may be larger than the outer diameter of the duct 10, 10' in which case a flexible annular blanket or cushion 20 consisting for instance of glass wool or of soft foam possibly of the same nature as the heat-insulation 11 is interposed between the bush or sleeve 13b and the tubular duct 10 or 10'.

Each distance-piece 13 is advantageously made in two parts or pieces forming half-shells assembled together through adhesive bonding or mechanically so as to slightly compress or squeeze the blanket 20 interposed therebetween.

The pipe according to the invention advantageously comprises a device for detecting or sensing the leakages of the fluid carried by this pipe, comprising at least one longitudinal passage-way 21 provided at the interface between the inner tubular duct 10 or 10' and the heat-insulating intermediate layer 11 so as to be defined by the latter and by the outer wall side of said tubular duct, each passage-way 21 extending preferably throughout the useful length of the pipe and being provided in particular at at least one end thereof with a fitting or like connector for communication with the outside. FIG. 2 illustrates such a passage-way 21 in longitudinal section extending through the soft foam blanket 20 and FIG. 3 shows three such passage-ways 21 equidistant or equally spaced angularly from each other about the inner tubular duct 10 or 10'.

The invention relates also to a process of detecting leakages on a pipe according to the invention, adapted to convey in particular very cold fluids such as liquefied natural gases and FIG. 7 shows an operating block diagram of such a process. The method consists in causing an inner gas such as nitrogen to flow from a tank of inner gas 22 through each aforesaid passage-way 21 so as to sweep the latter (operating step 23); qualitatively analyzing the exiting gas by means of a suitable detector sensing said conveyed fluid in order to discover traces of hydrocarbons therein (operating step 24); possibly measuring the leakage flow rate with a suitable quantitative flow-meter 25 and actuating an alarm device 26 in case of leakage detection. Thus any leakage of liquefied natural gas flowing inside of the inner tubular duct 10 or 10' and through the wall thereof is collected or gathered by the passage-ways 21 so that it is possible to detect therein any leakage of liquefied hydrocarbon gases which would besides vaporize therein. Owing to the flow rate measurement it is thus possible to impose a maximum admissible or tolerable leakage.

It should be understood that the invention is not at all limited to the embodiments described and shown which have been given by way of illustrative examples only. In particular it comprises all the means constituting technical equivalents of the means described as well as their combinations if same are carried out according to its gist and used within the scope of the appended claims.

What is claimed is:

1. A flexible fluid-conveying pipe, of the kind comprising: an inner tubular duct, a layer of heat-insulating material surrounding in closely engaging relationship said inner tubular duct, and an outer protective casing surrounding in closely engaging relationship said heat-insulating layer, said protective casing consisting of a tough flexible fluid-tight tubular conduit connected to said inner tubular duct by retaining distance-pieces made in particular of relatively rigid cellular material and longitudinally spaced from each other and distributed at discrete locations while bearing against said inner tubular duct; said inner tubular duct consisting of at least three layers radially overlying in closely engaging relationship and including one single inner layer consisting of a metal wire helically wound with mutually spaced turns; and intermediate layer of yielding composite material surrounding said inner layer; and a single outer layer consisting of a metal wire helically wound about said intermediate layer but having its turns longitudinally offset by one half winding pitch with respect to those, respectively, of said inner wire layer so as to be located between the turns, respectively, of the latter, said single outer layer being substantially identical in particular in at least its own diameter and winding diameter and its winding pitch with said inner wire layer; wherein the improvement consists in that a blanket of relatively soft material is interposed between each aforesaid distance-piece and said inner tubular duct while being slightly compressed therebetween.

2. A pipe according to claim 1, wherein said heat-insulating layer is made from flexible cellular or expanded material having a relative elongation on break up to 15% at very low temperature.

3. A pipe according to claim 2, wherein said heat-insulating intermediate layer is made from a substance selected from the group comprising: a polypropyleneoxide foam, a poly(vinyl chloride) foam with incorporated plasticizers, an ethylene-vinyl acetate copolymer and is in particular made in prefabricated shells.

4. A pipe according to claim 1, wherein said intermediate layer consists of at least one close-jointed sheath consisting of a strip sidewise closed on itself with its longitudinally closed-jointed edges assembled in particular through adhesive bonding in partially mutually overlapping relationship.

5. A pipe according to claim 4, wherein said intermediate layer consists of at least two overlying close-jointed sheaths in particular stuck together the respective lap-joints of which are angularly offset with respect to each other and in particular positioned in diametrally opposite relationship.

6. A pipe according to claim 4, wherein the adhesive bonding means is a glue having a particularly low setting point lying in particular between $-50°$ C. and $-70°$ C. and having a relative elongation on break in the hardened state lying between 5% and 10%.

7. A pipe according to claim 6, wherein said glue is based on a substance selected from the group comprising synthetic chloroprene rubber and polyurethane elastomer.

8. A pipe according to claim 1, wherein said intermediate layer consists of at least one strip helically wound in one single layer about said inner strip with in particular adhesively bonded partial mutual overlap of the successive turns of said strip.

9. A pipe according to claim 8, wherein said intermediate layer consists of at least two substantially like strips helically wound likewise one about the other but in opposite directions so as to cross each other and assembled together in particular through adhesive bonding.

10. A pipe according to claim 8, wherein each aforesaid strip has a width equal to about twice to three times its winding diameter and the least width of overlap between adjacent turns is equal to about one half of the width of the strip when the latter is less than 200 mm wide or to about 100 mm when said strip is wider.

11. A pipe according to claim 1, wherein said wire is made from a metal which is not brittle at low temperatures and under mechanical loads i.e. which does not exhibit any transitory ductile-fragile phenomenon, such as austenitic stainless steel and its winding pitch is equal in particular to about one half or one third of its winding diameter.

12. A pipe according to claim 1, wherein said yielding composite material of said intermediate layer consists of at least one laminated sheet having in particular an aggregate thickness of about 1 mm and consisting of at least three overlying layers consisting of one impervious middle layer positioned between two substantially like end layers; each end layer consisting of a fabric of synthetic textile fibers with a plain weave forming a cloth-like taffet fabric, made from aromatic polyamide (so-called aramide) fibers such as those known in the trade under the name of KEVLAR and having a specific surface weight lying between 300 g/m$^2$ and 500 g/m$^2$ whereas said middle layer consists of a very thin strip-iron like metal sheet in particular of 18-8 austenitic stainless steel having in particular a thickness of about 0.1 mm to 0.2 mm, these adjacent layers being mutually assembled together in closely contacting relationship through adhesive bonding in particular by means of a synthetic chloroprene rubber-base glue.

13. A pipe according to claim 1, wherein both opposite respectively inner and outer end sides of said intermediate layer which are engaging said metal wire are each one faced with a flexible liner promoting slipping between said metal wire while providing for the cohesion and protection of said sides, said liner being in particular made from a polyurethane elastomer with a thickness in particular of about 0.3 mm.

14. A pipe according to claim 1, wherein said protective casing consists of a tube made from a material selected from the group comprising rubber and synthetic resin strengthened with in particular reinforcing metal wires.

15. A pipe according to claim 14, wherein said reinforcing metal wires are made from ferritic steel and are distributed in several overlying sheets of parallel wires inclined in each sheet with crossing of the wires of two successive adjacent sheets, said wires being bonded by a synthetic resin based in particular on an aliphatic polyamide such as that known in the trade under the name of RILSAN.

16. A pipe according to claim 1, wherein each aforesaid distance-piece is made from a polyurethane foam having an apparent specific gravity or density of about 0.5 as well as high mechanical characteristics and consisting in particular of two half-shells assembled together through sticking or mechanically.

17. A pipe according to claim 1, further comprising a device for detecting leakages of the carried fluid and comprising at least one longitudinal passage-way provided at the interface between said inner tubular duct and said heat-insulating intermediate layer so as to be defined by the latter and by the outer wall side of said inner tubular duct, each passage-way extending throughout the useful length of the pipe.

18. A flexible fluid-conveying pipe, of the type comprising: an inner tubular duct, a layer of heat-insulating material surrounding in closely engaging relationship said inner tubular duct and an outer protective casing surrounding in closely engaging relationship said heat-insulating layer, said inner tubular duct consisting of at least three layers radially overlying in closely engaging relationship and including one single inner layer consisting of a metal wire helically wound with mutually spaced turns; an intermediate layer of yielding composite material surrounding said inner layer; and a single outer layer consisting of a metal wire helically wound about said intermediate layer but having its turns longitudinally offset by one half winding pitch with respect to those, respectively, of said inner wire layer so as to be located between the turns, respectively, of the latter, said single outer layer being substantially identical in particular in at least its own diameter and winding diameter and its winding pitch with said inner wire layer, wherein the improvement consists in that both opposite respectively inner and outer end sides of said intermediate layer which are engaging said metal wire are each one faced with a flexible liner promoting slipping between said metal wire while providing for the cohesion and protection of said sides, said liner being in particular made from a polyurethane elastomer with a thickness in particular of about 0.3 mm.

19. A pipe according to claim 18, wherein said heat-insulating layer is made from flexible cellular or expanded material having a relative elongation on break up to 15% at very low temperature and wherein said outer protective casing consists of a tough flexible fluid-tight tubular conduit connected to said inner tubular duct by retaining distance-pieces made in particular from relatively rigid cellular material and longitudinally spaced from each other and distributed at discrete locations while bearing against said inner tubular duct.

20. A pipe according to claim 19, further comprising a blanket of relatively soft material interposed between each aforesaid distance-piece and said inner tubular duct while being slightly compressed therebetween.

21. A pipe according to claim 19, wherein said heat-insulating layer is made from a substance selected from the group comprising: a polypropylene-oxide foam, a poly(vinyl chloride) foam with incorporated plasticizers, an ethylenevinyl acetate copolymer and is in particular made in prefabricated shells.

22. A pipe according to claim 19, wherein said protective casing consists of a tube made from a material selected from the group comprising rubber and synthetic resin strengthened with in particular reinforcing metal wires.

23. A pipe according to claim 22, wherein said reinforcing metal wires are made from ferritic steel and are distributed in several overlying sheets of parallel wires included in each sheet with crossing of the wires of two successive adjacent sheets, said wires being bonded by a synthetic resin based in particular on an aliphatic polyamide such as that known in the trade under the name of RILSAN.

24. A pipe according to claim 19, wherein each aforesaid distance-piece is made from a polyurethane foam having an apparent specific gravity or density of about 0.5 as well as high mechanical characteristics and consisting in particular of two half-shells assembled together through sticking or mechanically.

25. A pipe according to claim 18, wherein said intermediate layer consists of at least one close-jointed sheath consisting of a strip sidewise closed on itself with its longitudinally closed-jointed edges assembled in particular through adhesive bonding in partially mutually overlapping relationship.

26. A pipe according to claim 25, wherein said intermediate layer consists of at least two overlying close-jointed sheaths in particular stuck together the respective lap-joints of which are angularly offset with respect to each other and in particular positioned in diametrically opposite relationship.

27. A pipe according to claim 25, wherein the adhesive bonding means is a glue having a particularly low setting point lying in particular between −50° C. and −70° C. and having a relative elongation on break in the hardened state lying between 5% and 10%.

28. A pipe according to claim 27, wherein said glue is based on a substance selected from the group comprising synthetic chloroprene rubber and polyurethane elastomer.

29. A pipe according to claim 18, wherein said intermediate layer consists of at least one strip helically wound in one single layer about said inner strip with in particular adhesively bonded partial mutual overlap of the successive turns of said strip.

30. A pipe according to claim 29, wherein said intermediate layer consists of at least two substantially like strips helically wound likewise one about the other but in opposite directions so as to cross each other and assembled together in particular through adhesive bonding.

31. A pipe according to claim 29, wherein each aforesaid strip has a width equal to about twice to three times its winding diameter and the least width of overlap between adjacent turns is equal to about one half of the width of the strip when the latter is less than 20 mm wide or to about 100 mm when said strip is wider.

32. A pipe according to claim 18, wherein said wire is made from a metal which is not brittle at low temperatures and under mechanical loads i.e. which does not exhibit any transitory ductilefragile phenomenon, such as austenitic stainless steel and its winding pitch is equal in particular to about one half or one third of its winding diameter.

33. A pipe according to claim 18, wherein said yielding composite material of said intermediate layer consists of at least one laminated sheet having in particular an aggregate thickness of about 1 mm and consisting of at least three overlying layers consisting of one impervious middle layer positioned between two substantially like end layers; each end layer consisting of a fabric of synthetic textile fibres with a plain weave forming a cloth-like taffet fabric, made from aromatic polyamide (so-called aramide) fibres such as those known in the trade under the name of KEVLAR and having a specific surface weight lying between 300 g/m² and 500 g/m² whereas said middle layer consists of a very thin strip-iron like metal sheet in particular of 18-8 austenitic stainless steel having in particular a thickness of about 0.1 mm to 0.2 mm, these adjacent layers being mutually assembled together in closely contacting relationship through adhesive bonding in particular by means of a synthetic chloroprene rubber-based glue.

34. A pipe according to claim 18, further comprising a device for detecting leakages of the carried fluid and comprising at least one longitudinal passage-way provided at the interface between said inner tubular duct and said heat-insulating layer so as to be defined by the latter and by the outer wall side of said inner tubular duct, each passage-way extending throughout the useful length of the pipe.

* * * * *